(12) United States Patent
Carter et al.

(10) Patent No.: US 8,780,382 B2
(45) Date of Patent: Jul. 15, 2014

(54) PROCESSING OF ELECTRONIC DOCUMENTS TO ACHIEVE POSTAGE OPTIMIZATION

(75) Inventors: David Ray Carter, The Woodlands, TX (US); Sherri A. Sullivan, Newark, DE (US); Joseph G. Toy, Middletown, DE (US); Daniel G. Fletcher, Matthews, NC (US); George M. Freebersyser, Jr., St. Peters, MO (US); Michael Tate, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1160 days.

(21) Appl. No.: 12/103,950

(22) Filed: Apr. 16, 2008

(65) Prior Publication Data

US 2009/0262384 A1 Oct. 22, 2009

(51) Int. Cl.
*G06F 3/12* (2006.01)
*G07B 17/04* (2006.01)
*B07C 1/00* (2006.01)

(52) U.S. Cl.
USPC .......................... 358/1.15; 705/406

(58) Field of Classification Search
USPC .......... 358/1.15, 1.16; 705/7, 400; 718/1, 100
See application file for complete search history.

(56) References Cited

U.S. PATENT DOCUMENTS

| | | | |
|---|---|---|---|
| 6,195,174 B1 * | 2/2001 | Johnson et al. | 358/1.18 |
| 6,856,860 B2 * | 2/2005 | Stringham et al. | 700/223 |
| 2003/0233321 A1 | 12/2003 | Scolini et al. | |
| 2004/0160634 A1 * | 8/2004 | Watanabe | 358/1.15 |
| 2004/0220997 A1 | 11/2004 | De Saint-Johns | |
| 2006/0080122 A1 * | 4/2006 | Klopsch et al. | 705/1 |

OTHER PUBLICATIONS

International Search Report and Written Opinion for Application No. PCT/US09/40801 mailed Sep. 17, 2009.
International Preliminary Report on Patentability for PCT Application No. PCT/US2009/040801 mailed Oct. 28, 2010.

* cited by examiner

*Primary Examiner* — Mark Zimmerman
*Assistant Examiner* — Mesfin Getaneh
(74) *Attorney, Agent, or Firm* — Banner & Witcoff, Ltd.; Michael A. Springs

(57) ABSTRACT

A method is suitable for processing a plurality of electronic documents designated for processing and delivery to a plurality of recipients, each recipient having a zip code associated therewith. Each electronic document is assigned a plurality of attributes, and the documents are sorted into one or more attribute groups based on the attributes, such that the electronic documents of each attribute group share at least one of the attributes. Output groups are then formed from the electronic documents of each attribute group based on the zip code associated with each electronic document, such that the electronic documents of each output group have similar zip codes. The output groups can then be routed to processing sites for processing the electronic documents to form physical documents for delivery to the recipients.

20 Claims, 4 Drawing Sheets

PROCESSING OF ELECTRONIC DOCUMENTS TO ACHIEVE POSTAGE OPTIMIZATION

TECHNICAL FIELD

The invention relates to a system and method for routing the physical processing of electronic documents, and more specifically, to a system and method for achieving postage optimization through grouping by zip codes.

BACKGROUND

Many financial institutions and other businesses or entities generate a large quantity of mail on a monthly, weekly, and even daily basis, and the cost of producing and delivering this mail can be significant. Accordingly, steps to decrease cost and increase efficiency in the mailing process has the potential to save a great deal of time and money. One way to decrease mail costs is to take advantage of bulk discounts. For example, the U.S. Postal Service offers discounts based on "zip code density," or the number of pieces being delivered to a particular zip code. In the current system, the best postage rate available can be achieved by mailing a critical number of mail pieces (currently 150) to a particular five-digit zip code. Next-best discounted postal rates can be achieved by mailing a critical number of pieces to a particular three-digit zip code, having the first three digits identical. For example, the zip codes 60606, 60610, 60614, and 60657 would all fall under the same three-digit zip code (606XX). The U.S. Postal Service also requires a manifest listing the relevant mail pieces in order to get the aforementioned discounts. Other delivery services may have such discounts or incorporate them in the future.

Various methods have been used to arrange mailings in order to achieve such postal densities. Among the most prevalent of such methods is physically sorting the printed and enveloped mail pieces and generating a manifest, prior to transferring the mail pieces to the Postal Service for delivery. The time and cost of physically sorting the mail pieces thus increases the total cost of mailing. Additionally, this sorting service is often performed by third-party service entities, which may require delivery of the mail to a separate sorting site prior to transferring the mail to the Postal Service. This separate step may further increase the cost and time consumed by mailing. As such, these and other prior systems and methods have certain drawbacks and disadvantages.

BRIEF SUMMARY

The present system and method are provided to solve the problems discussed above and other problems, and to provide advantages and aspects not provided by prior systems and methods of this type.

Aspects of the present invention relate to a method for processing a plurality of electronic documents designated for processing and delivery to a plurality of recipients, each recipient having a zip code associated therewith. The documents are received through a plurality of print files, and may be received from a plurality of applications. One or more output groups of the electronic documents are formed, based on the zip code associated with each electronic document, such that the electronic documents of each output group have similar zip codes. The output groups can then be routed to processing sites for processing the electronic documents to form physical documents for delivery to the recipients. The electronic documents of each output group may share the same three-digit zip code or the same five-digit zip code. Additionally, the output groups may be routed to the processing sites by creating output print files containing the documents in the group and transmitting the output print files to the processing sites.

Additional aspects of the invention relate to a method for processing electronic documents, where each document is assigned a plurality of attributes. The electronic documents are sorted into one or more attribute groups based on the attributes, such that the electronic documents of each attribute group share at least one of the attributes. Output groups are then formed from the electronic documents of each attribute group based on the zip code associated with each electronic document, such that the electronic documents of each output group have similar zip codes. The output groups can then be routed to processing sites for processing the electronic documents to form physical documents for delivery to the recipients. Examples of attributes that may be assigned to the documents include date and time of creation, due-out date, paper type, envelope type, page count, toner type, barcode type, roll capacity, return mail address, and insert requirements. The attributes may be assigned to each electronic document after the documents are received and prior to sorting.

According to one aspect, the output groups are formed and routed to the respective processing sites when a critical number of documents having the same zip code is reached.

According to another aspect, the at least one shared attribute may be related to physical processing requirements for the electronic documents, such as paper type, envelope type, toner type, barcode type, and insert requirements.

Further aspects of the invention relate to a method for processing electronic documents, each having a delivery zip code associated therewith. The electronic documents are held in a virtual warehouse until at least a critical number of electronic documents having similar zip codes is reached, and the documents having similar zip codes are then routed to a processing site for processing after at least the critical number is reached. The method may be repeated for each zip code or set of similar zip codes.

According to one aspect, each electronic document has a due-out date associated therewith. When the due-out date of a document is proximate prior to the critical number being reached, that document is routed to the processing site prior to the critical number being reached, so as to avoid late mailing of the document. The critical number of electronic documents having similar zip codes may share the same three-digit zip code or the same five-digit zip code.

According to one aspect, the due-out document may be one of a group of electronic documents having similar zip codes, and when the due-out date of the first electronic document is proximate prior to the critical number being reached, the profitability of artificially creating and mailing additional documents may be determined. The cost of processing and mailing the group of electronic documents is calculated and then compared to the cost of processing and mailing the group of electronic documents along with one or more artificially-created additional documents required to reach the critical number. If it is determined to be profitable, the additional documents are artificially created and routed to the processing site with the group.

Still further aspects of the invention relate to a system having components configured for performing the methods described herein, and to a computer program product that is configured to cause a computer component to perform the methods described herein.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

To understand the present invention, it will now be described by way of example, with reference to the accompanying drawings in which.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
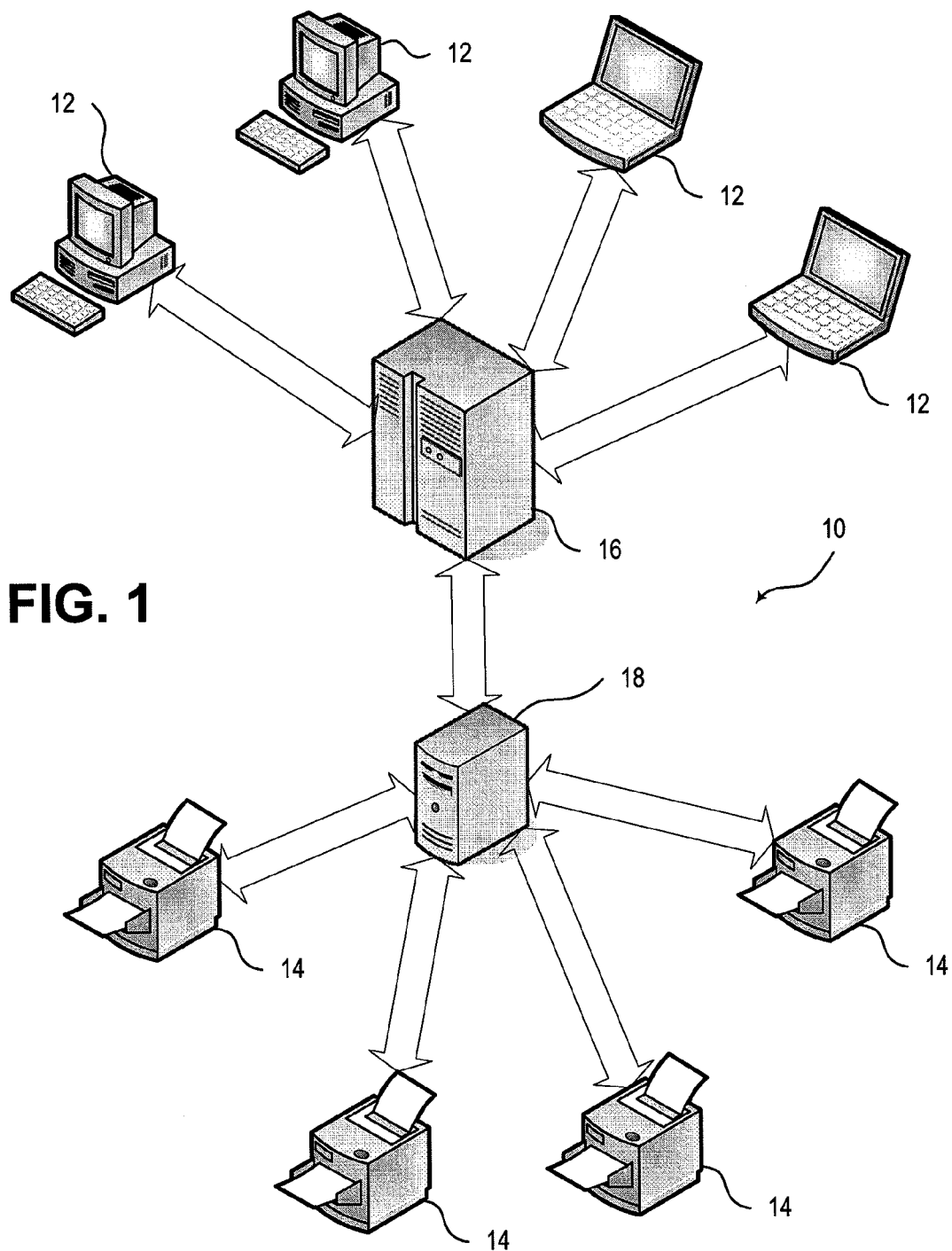
FIG. 1 is a schematic diagram of one embodiment of a system containing computers and processing sites for processing documents.

FIG. 1 illustrates a diagram of a system 10 that may be used according to an illustrative embodiment of the invention. The system 10 includes a plurality of computers 12 that are all connected to a mainframe 16 in communication with a server 18, as well as a plurality of processing sites 14 in communication with the server 18. It is understood that the system of FIG. 1 is simplified, and may contain other components. For example, the server 18 is shown as a single computer for sake of simplicity, but may be a plurality of servers in some embodiments. Each processing site 14 contains one or more pieces of processing equipment 20 for processing documents, such as printers, enclosure feeders, page/sheet inserting equipment, folders, pressure sealing apparatuses, quality assessment apparatuses, and the like, and may also contain a barcode reader. In this embodiment, the system 10 is configured so that all documents to be produced by the system 10 are routed through the server 18 en route to the processing sites 14. Although the system 10 illustrates the use of a central server 18, it is contemplated that in other embodiments, several servers may be distributed throughout the system 10. Additionally, in other embodiments, the system may not contain a mainframe, or the server may be a part of the mainframe.

Figure 2:
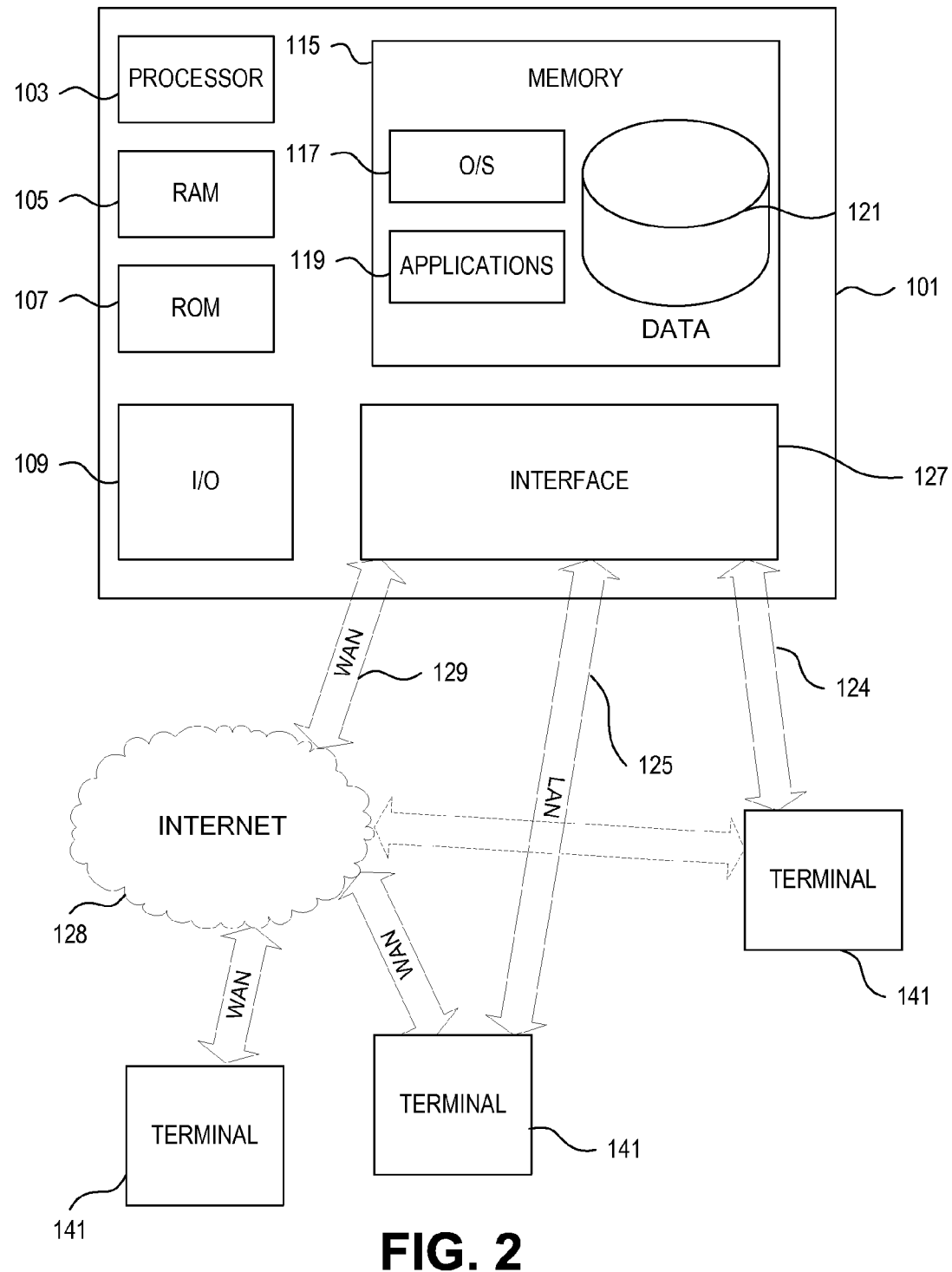
FIG. 2 is a schematic diagram of one embodiment of a computer system.

FIG. 2 illustrates a block diagram of a computer 101 that may be used according to an illustrative embodiment of the invention. Any of the computer components of FIG. 1, such as the server 18, mainframe 16, and computers 12, may be embodied generally as shown in the computer 101 of FIG. 2. The computer 101 may have a processor 103 for controlling overall operation of the computer 101 and its associated components, including RAM 105, ROM 107, input/output module 109, and memory 115. I/O 109 may include a user input device through which a user of computer 101 may provide input, such as a microphone, keypad, touch screen, mouse, and/or stylus, and may also include one or more of a speaker for providing audio output and a video display device for providing textual, audiovisual and/or graphical output.

Software may be stored within memory 115 and/or storage to provide instructions to processor 103 for enabling the computer 101 to perform various functions, including functions relating to the methods described herein. For example, memory 115 may store software used by the computer 101, such as an operating system 117, application programs 119, and an associated database 121. Alternatively, some or all of the computer executable instructions may be embodied in hardware or firmware (not shown). As described in detail below, the database 121 may provide centralized storage of information for a business, allowing interoperability between different elements of the business residing at different physical locations. It is understood that a computer system 101, single processor 103, and single memory 115 are shown and described for sake of simplicity, and that the computer system 101, processor 103, and memory 115 may include a plurality of computer systems, processors, and memories respectively.

The computer 101 may be configured to operate in a networked environment supporting connections to one or more other computers, such as terminals 141. The terminals 141 may be personal computers or servers that include many or all of the elements described above relative to the computer 101. The network connections depicted in FIG. 1 include a wide area network (WAN) 129, but may also include other networks, such as a local area network (LAN) 125. When used in a LAN networking environment, the computer 101 is connected to the LAN 125 through a network interface or adapter 123. When used in a WAN networking environment, the computer 101 may include a modem 127 or other means for establishing communications over the WAN 129, such as the Internet 128. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer 101 according to an illustrative embodiment of the invention may include computer executable instructions for invoking user functionality related to communication, such as email, short message service (SMS), and voice input and speech recognition applications.

Figure 3:
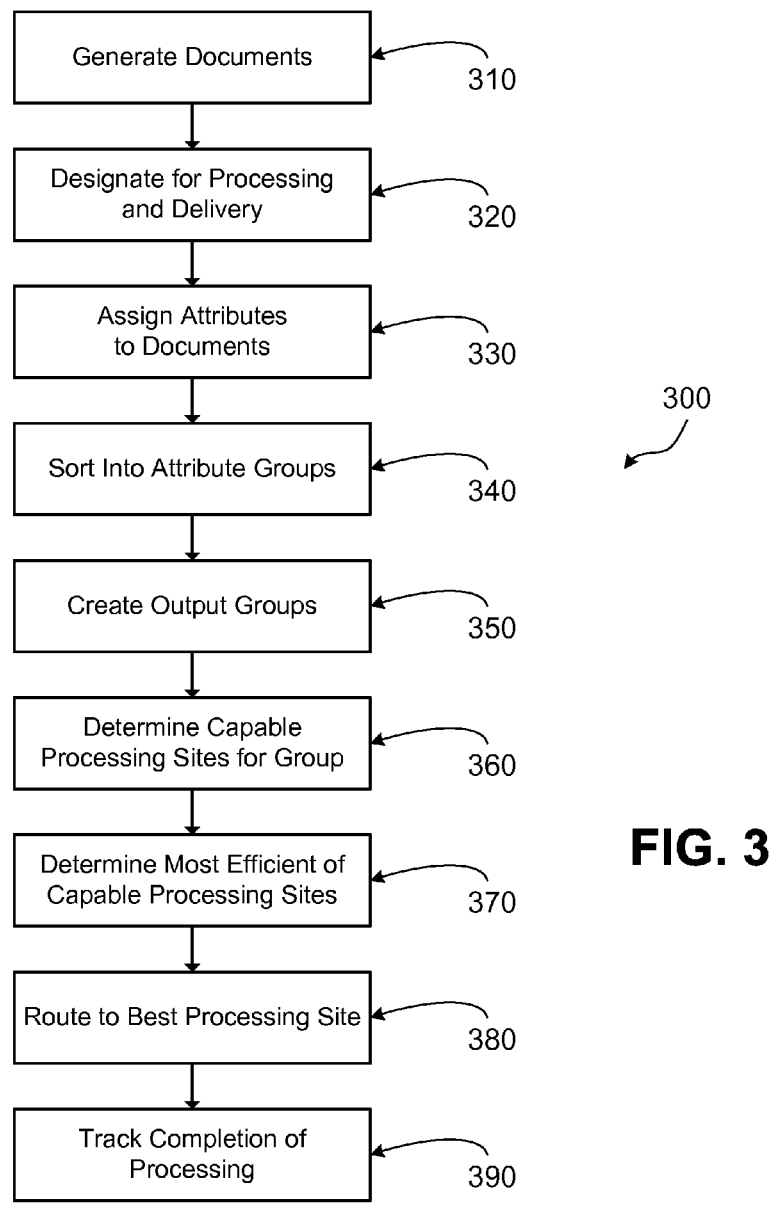
FIG. 3 is a flow diagram of one embodiment of a method for routing physical processing of documents for manufacturing efficiency.

FIG. 3 illustrates one exemplary embodiment of a method 300 for routing physical processing of electronic documents, which may be used in connection with the system 10 of FIG. 1. At step 310, a plurality of electronic documents are generated in virtual (electronic) form, such as by computers 12, or by the mainframe 16 or by the server(s) 18, in the system of FIG. 1. These electronic documents may be generated using one or more different applications, and in one embodiment, the documents are generated using a plurality of different applications, such as on computers 12 of the system 10 of FIG. 1.

At step 320, the electronic documents are designated for processing, such as by the application(s) that created the documents. "Processing," as used herein, generally refers to printing or other form of production of physical documents, but may also encompass further actions such as placing the physical document in an envelope, folding the document, printing the envelope, placing one or more inserts with the document, printing shipping labels, assembling or filling packages, and the like, and other actions which may be necessary for delivery. In one embodiment, electronic documents may be designated for processing by transmitting one or more of the documents as a print file or print job generated by an application, as known in the art. When used in connection with the system 10 of FIG. 1, the print files generated by the applications are received by the server 18.

At step 330, a plurality of attributes are assigned to each of the electronic documents. In one embodiment, which may be used with the system 10 of FIG. 1, the server 18 assigns the attributes to each document after receiving the documents. Some such attributes may be included in the print file, and others may be separately stored, such as on the server or another controlling device, and/or deduced from the print file or job name. Additionally, certain characteristics may be used as look-up variables for attribute information stored in database or configuration tables. In other embodiments, the attributes may be assigned by another entity or at another point in the process. For example, an application at computers 12 may assign attributes to the documents before transmitting them. In one exemplary embodiment, the attributes describe characteristics of the processing and/or delivery of the electronic documents, but may also describe various properties of the electronic documents themselves. For example, the attributes may include such properties as: date and time of creation of the document, due-out date (i.e., when the document must be mailed), paper type, envelope type, page count, toner type, barcode type, insert requirements, roll capacity, return mail address, and zip code for delivery. The paper type attribute generally describes the type of paper that the document is to be printed on, which can have properties such as paper size (letter, legal, A4, and the like), paper weight, paper finish, paper recyclability, and other paper properties. The envelope type attribute generally describes properties of the envelope and/or insertion of a printed document into the envelope. For example, in one embodiment, the envelope type attribute describes the return address, envelope window placement, orientation (e.g. portrait vs. landscape), envelope size, indicia on the envelope (e.g. mail permit number or stamp required), and letter fold configuration of the envelope. The envelope type may also describe the recyclability of the envelope. The page count attribute describes the number of pages the document will be when printed. The toner type attribute describes the type, color, and the like, of toner to be used in printing the document. The barcode type indicates the barcode "font" that will be used on the document and/or envelope, if any. The insert requirements attribute indicates the number and configuration of any insert(s) that are to be placed in the envelope along with the document, if any. The zip code for delivery indicates the zip code for the recipient to whom the document will be delivered. In other embodiments, alternate or additional document attributes may be incorporated into the method.

At step 340, server 18 sorts the electronic documents from the print files into one or more attribute groups, based on at least one of the attributes, such that all of the documents in one attribute group share such attribute(s). In one exemplary embodiment, the documents are sorted to enable processing of the documents at a single processing site, which may have certain physical processing requirements. Accordingly, grouping of the documents by attributes reflecting such physical processing requirements for the documents allows for a processing site to be selected that is capable of processing all the documents in a single run. For example, in one embodiment, all documents in each group may share the same paper type, envelope type, and toner type, and may later be routed to a processing site that uses that paper type, envelope type, and toner type, as described below.

For processing, one or more output groups may be formed from each attribute group, at step 350. In one embodiment, output groups can be formed by further restricting the output groups based on an additional attribute. For example, in one example, the output grouping may further include grouping by zip code so that all the documents in an output group share the same zip code. It is understood that an output group may be exactly the same as the corresponding attribute group, with respect to the documents contained therein.

Once the output groups are formed, the server 18 determines an appropriate processing site for processing the documents of the output group, based on analysis of the attributes of the group and the capabilities of the processing sites. In determining which processing site is appropriate, the server 18 may consider factors such as the capability of the site to process the entire output group and the efficiency with which the group can be processed. In the embodiment shown in FIG. 3, steps 360-370 determine an appropriate processing site that is the "best" processing site for processing the group of documents. At step 360, the server 18 determines which of the plurality of processing sites 14 within the system 10 are capable of processing the output group, based on the attributes of the group. In one embodiment, the capabilities of the sites 14 are determined based both upon the particular processing configuration of each site and upon each site's availability to process the total page count of the output group. The processing configuration of the site can include such factors as paper type, toner type, envelope type, enclosure feeder availability, type of barcode reader associated with the site, paper input configuration, page count limitations, roll capacity, and whether the site can perform actions such as duplex/simplex printing and printing in certain formats, as well as other known limitations of such processing sites.

After one or more capable sites have been determined, the server 18 determines the best processing sites from the list of capable sites, at step 370. In one embodiment, the best site is the site that is able to process the documents most efficiently. In some cases, the best site may be the processing site that is fastest for processing print jobs having the attributes of the particular output file. However, in many cases, efficiency may be increased by selecting a slower site with less current production assigned thereto, rather than the fastest site, which may have a heavy load already and may need some time to even begin printing the output group. In other words, many times the best and most efficient site may be the second- or third-best site as viewed in a vacuum, but which may be more efficient because better and/or faster sites may be backed up with a number of other print jobs. In the embodiment shown in FIG. 3, the server 18 is configured make decisions based on all of these considerations. In one embodiment, the inputs used by the server 18 for these purposes are compiled and stored based on the historic performance of certain processing sites and equipment. In other embodiments, the server 18 may obtain data for production estimates in some other manner, for example, by real-time updating. Further, the server 18 may take further considerations into account, and may also be configured to not take certain of the above considerations into account.

The output group is then routed to the best processing site for printing and delivery, at step 380. The output group may be in the form of an output print file that is transmitted from the server 18 to the processing site, in one embodiment. Additionally, the completion of the processing is tracked at step 390, for use by the server 18 in determining the availability and current load of the processing site for future site assignment purposes. Additionally, it is contemplated that the speed of processing can be tracked to provide speed and efficiency estimates for future processing.

It is understood that steps 350-390 can be repeated for each attribute group, and that the entire method 300 can be repeated when new documents are received, such as by continuous or cyclic repetition. It is further understood that certain steps of the embodiment of the method described above may be omitted in other embodiments, and that other embodiments may also contain additional steps not described above. For example, in one embodiment, the documents may not be sorted into attribute groups, and may be routed based on the attributes of an unsorted or undivided group of documents.

Figure 4:
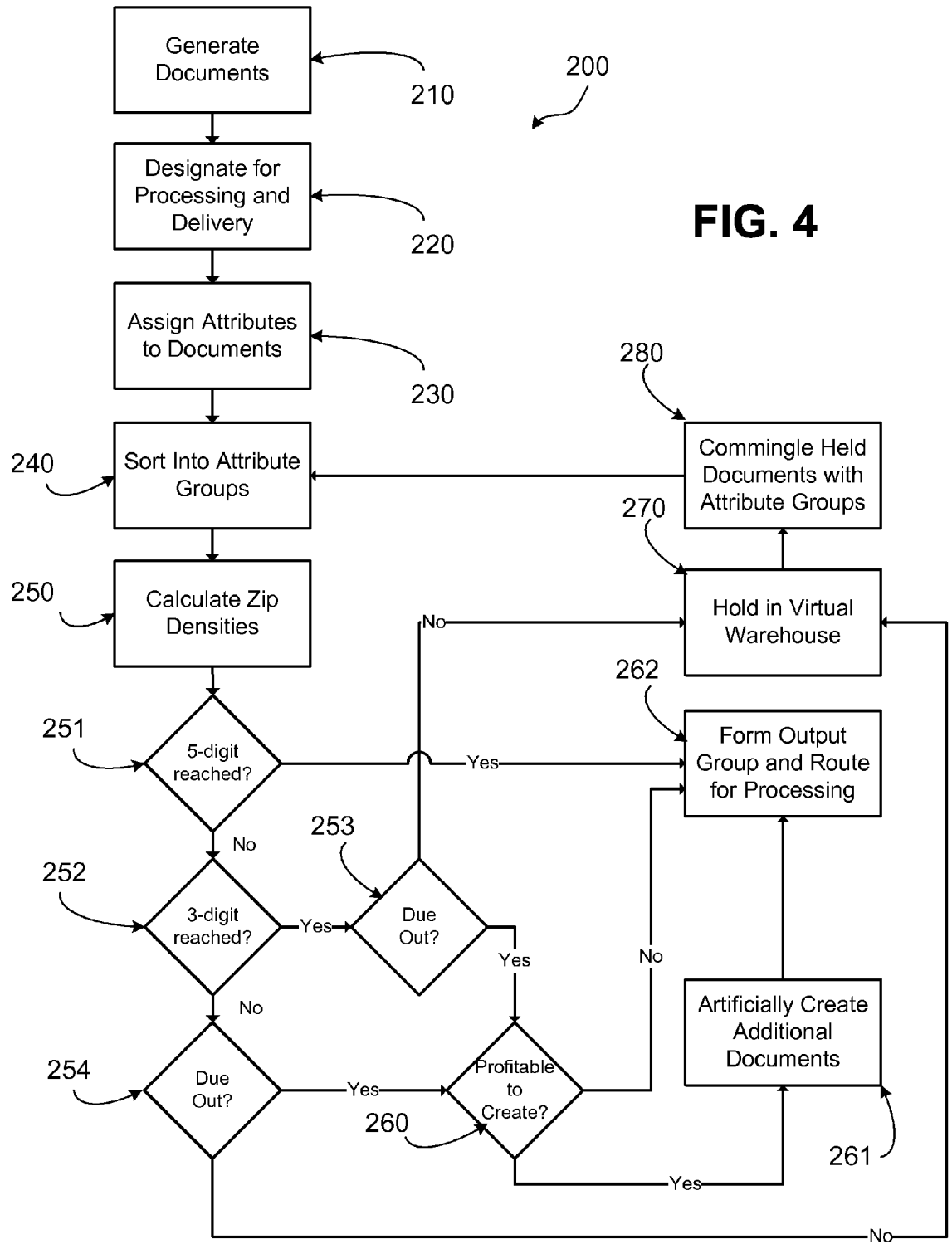
FIG. 4 is a flow diagram of one embodiment of a method for routing physical processing of documents to achieve postage optimization.

FIG. 4 illustrates one exemplary embodiment of a method 200 for routing physical processing of electronic documents, which may be used in connection with the system 10 of FIG. 1. The method 200 of FIG. 4 can be used independently, or can be used in conjunction with the method 300 of FIG. 3. At step 210, a plurality of electronic documents are generated in virtual (electronic) form, as described above with respect to step 310 in FIG. 3. At step 220, the electronic documents are designated for processing and delivery, such as by the application(s) that created the documents. "Delivery," while described generally herein with respect to mail delivery by the U.S. Postal Service, includes delivery of mail, parcels, and the like, via other entities and services. Accordingly, processing may also include printing shipping labels, assembling or filling packages, and the like. In one embodiment, electronic documents may be designated for processing and delivery by transmitting one or more of the documents as a print file or print job generated by an application, as known in the art. When used in connection with the system 10 of FIG. 1, the print files generated by the applications are received by the server 18.

At step 230, a plurality of attributes are assigned to each of the electronic documents, as described above with respect to step 330 in FIG. 3.

At step 240, server 18 sorts the electronic documents from the print files into one or more attribute groups, based on at least one of the attributes, such that all of the documents in one attribute group share such attribute(s), as described above with respect to step 340 in FIG. 3. In one exemplary embodiment, the documents are sorted to enable processing of the documents at a single processing site, which may have certain physical processing requirements. Accordingly, grouping of the documents by attributes reflecting such physical processing requirements for the documents allows for a processing site to be selected that is capable of processing all the documents in a single run, as described above. For example, in one embodiment, all documents in each group may share the same paper type, envelope type, and toner type, and may later be routed to a processing site that uses that paper type, envelope type, and toner type.

Once the attribute groups are formed, "zip code densities" are calculated by the server 18, at step 250. More descriptively, the number of electronic documents having similar zip codes is calculated for each zip code. In one embodiment, the number of documents that have the same three-digit zip code (e.g., 606XX), and the same five-digit zip code are calculated. This embodiment can be used for taking advantage of the U.S. Post Office's three-digit and five-digit zip code pricing discounts. At step 251, the server 18 determines whether the critical number of documents sharing the same five-digit zip code has been reached. If so, then an output group is formed from the documents sharing the zip code and the output group is routed to a processing site for printing and delivery, at step 262. It is noted that an output group may be in the form of an output print file that is transmitted from the server 18 to the processing site. If not, then the server 18 determines whether the critical number of documents sharing the same three-digit zip code has been reached, at step 252. If so, then the server 18 determines whether any of the documents of the attribute group are proximate their respective due-out dates, at step 253. If one or more due-out dates are impending, the process proceeds to step 260, described below. If no due-out dates are proximate, then the process proceeds to step 270, described below.

If no critical number of documents sharing five-digit or three-digit zip codes has been reached, then a check is made to determine whether any of the documents of the attribute group are proximate their respective due-out dates, at step 254. If not, then the process proceeds to step 270, described below. If five-digit zip density has not been reached, and one or more documents is proximate the due-out date (from steps 253 or 254), then the server 18 calculates the profitability of artificially creating, processing, and mailing additional documents (referred to herein as "supplemental documents") necessary to reach the critical number of documents sharing three- or five- digit zip codes, at step 260. The calculation can include the profitability of creating documents to form five-digit zip code density groups from a three-digit zip code density group, or to form three- or five-digit zip code density groups from documents not having critical zip code density. This determination can be performed, for example, by calculating the cost of printing and mailing all the documents proposed to be mailed, then calculating the cost of printing and mailing the documents of the zip code group including the artificially-created supplemental documents (taking into account postal discounts for zip code densities), and then comparing the two costs. This cost comparison can be on a per-document basis, a total cost basis, or using another formula. If artificially creating the supplemental documents would be profitable, then the supplemental documents are created, at step 261, and the documents of the attribute group sharing the relevant zip code are sent for processing, along with the supplemental documents, at step 262. These documents can be formed into an output group for processing. If it is found not to be profitable, then the documents that are proximate the due-out date are sent for processing and mailing, at step 262. In one embodiment, only the documents proximate the due-out date may be sent for processing at this point. However, in another embodiment, all the documents of the attribute group sharing the zip code of the due-out document(s) may be sent for processing, and in a further embodiment, other combinations of documents may be sent for processing. It is contemplated that the evaluations of steps 260-262 can be used to calculate the profitability of artificially creating documents in order to achieve five-digit zip code density over existing three-digit zip code density, or to achieve five- or three- digit zip code density from a number of mixed documents having no critical zip code density.

If the critical five-digit zip density has not been reached, and if there are no documents proximate the due-out dates, then the remaining unprocessed electronic documents are held in a virtual warehouse, at step 270. The virtual warehouse may be any location for storage of the electronic documents for a desired time, and in one embodiment, the virtual warehouse resides in the memory of the server 18. In many cases, new electronic documents are being continuously created by the various applications, and thus, the method 100 is continuously repeated for the new electronic documents. In one embodiment, the method 100 is repeated in periodic cycles, such as monthly, weekly, daily, and the like. At step 280, the unprocessed documents in the virtual warehouse are commingled in their respective attribute groups with new documents sharing the same attributes, which have already been generated (step 210), designated for processing (step 220), and assigned attributes (step 230). The commingled documents can then proceed through the determinations of steps 250-280.

It is understood that steps 250-280 can be repeated for each attribute group and can also be repeated for each three-digit and five-digit zip code within each attribute group. For example, when output groups are formed and sent for processing at step 262, some or all of steps 250-270 may be repeated for remaining documents not included in the output groups. Additionally, steps 250-270 may be repeated until all documents have been analyzed for zip code grouping and no documents with impending due-out dates remain unprocessed, whereupon the remaining documents are all held in the virtual warehouse, at step 270. It is further understood that certain steps of the embodiment of the method described above may be omitted in other embodiments, and that other embodiments may also contain additional steps not described above. For example, in one embodiment, the documents may not be sorted into attribute groups, and may be sorted and/or grouped into output groups based on zip code alone.

The method 200 may also include the generation of a manifest, such as for use in achieving postage discount rates. As known in the art, these manifests list the mail pieces to be delivered to particular zip codes. In one embodiment, the server 18 or another component generates one or more manifests listing the physical documents to be mailed, such as by listing the documents produced at a particular process site. Such a manifest may be generated spontaneously, or may be created previously and continuously updated with the addition of new mail pieces. Other methods known in the art for creating manifests may be used with the system 10 and method 200 described above.

In one embodiment, aspects of the method for routing documents to achieve increased efficiency, such as described in FIG. 3, and aspects of the method for routing documents to achieve postage optimization, such as described in FIG. 4, can be combined together to form a single method for processing documents. In the embodiments of FIGS. 3 and 4, several steps are common between the methods, such as steps 310-340 and 210-240 of FIGS. 3 and 4, respectively. When combining such methods, repetition of these steps may not be necessary. For example, in one embodiment, steps 250-280 of the method of FIG. 4 can be incorporated in place of step 350 in FIG. 3. Similarly, the method of FIG. 4 can be practiced with steps 350-390 of FIG. 3 taking the place of steps 253 and/or 262 in FIG. 4. Other embodiments may feature different combinations of steps and aspects of the methods described herein.

As stated above, FIGS. 3 and 4 illustrate examples of one or more aspects of a method for routing physical processing of electronic documents. The steps of the methods described above can be accomplished by means and/or components contained within the computer system 101, such as the memory 115, processor 103, and/or program modules and computer-executable instructions stored therein or executed thereby, and may also be accomplished by non-computer means, such as by IT personnel or forensic investigators, or by a combination of human and computerized components. Other components of the computer system 101 may also constitute means for accomplishing aspects of the present invention, as understood by those skilled in the art. It is understood that one entity or computer system may not perform each and every aspect of the present invention and that aspects may be conducted by one or more external entities.

Aspects of the present invention are operational with numerous other general purpose or special purpose computing system environments or configurations, such as the computer system 101 shown in FIG. 2. Examples of well known computing systems, environments, and/or configurations that may be suitable for use with the present invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As described above, aspects of the present invention may be described in the general context of computer-executable instructions, such as program modules, being executed by a computer. Generally, program modules include routines, programs, objects, components, data structures, and the like that perform particular tasks or implement particular abstract data types. The present invention may also be practiced in distributed computing environments where tasks are performed by remote processing devices that are linked through a communications network. In a distributed computing environment, program modules may be located in the memory 115, which may include both local and remote computer storage media including memory storage devices. It is understood that connections and communications disclosed herein may be made by any type of wired or wireless connection or communication.

Aspects of the present invention provide many benefits not provided by prior systems and methods for routing physical processing of electronic documents. For example, the invention allows for processing documents with greater efficiency. The attribute grouping features provide the ability to route a print job to a processing site capable of processing the entire print job without stopping to change the setup or configuration. Additionally, the use of attributes enables selection of processing sites to achieve the fastest and most efficient processing of each print job. Further, the invention allows for processing documents so as to take greater advantage of bulk postage discounts offered by the U.S. Postal Service, without requiring an additional sorting step after printing. The invention also allows for increased efficiency and speed in processing documents through attribute groupings Still further, the invention ensures that documents will be mailed on time, even if they are held to attain shipping discounts. Still other benefits and advantages exist and are apparent to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is further understood that the invention may be in other specific forms without departing from the spirit or central characteristics thereof. The present examples therefore are to be considered in all respects as illustrative and not restrictive, and the invention is not to be limited to the details given herein. The term "plurality," as used herein, indicates any number greater than one, either disjunctively or conjunctively, as necessary, up to an infinite number. Accordingly, while the specific examples have been illustrated and described, numerous modifications come to mind without significantly departing from the spirit of the invention and the scope of protection is only limited by the scope of the accompanying claims.

What is claimed is:

1. A method comprising:
    receiving, at a computer system, a plurality of electronic documents designated for processing and delivery to a plurality of recipients, each recipient having a zip code associated therewith;
    sorting, by the computer system, the plurality of electronic documents into a plurality of attribute groups based on attributes of the plurality of electronic documents, wherein for each of the plurality of attribute groups, the plurality of electronic documents of one attribute group of the plurality of attribute groups share at least one common attribute;
    forming, by the computer system, a plurality of output groups from the plurality of electronic documents of each of the plurality of attribute groups based on the zip code associated with each electronic document of the plurality of electronic documents;
    calculating, by the computer system, a first cost of processing and mailing a selected one of the plurality of output groups;
    calculating, by the computer system, a second cost of processing and mailing the selected output group along with one or more additional documents sufficient to reach a predetermined number of documents;
    creating, by the computer system responsive to determining that the second cost is less than the first cost, the one or more additional documents; and
    routing, by the computer system, the selected output group to one or more processing sites for processing the electronic documents of the plurality of output groups to form a plurality of physical documents for delivery to the plurality of recipients, wherein the electronic documents of the selected output group are routed separately from any other electronic documents of an attribute group from which the selected output group was formed.

2. The method of claim 1, wherein the electronic documents of a first output group are held in a virtual warehouse until at least a critical number of electronic documents having similar zip codes is reached based on requirements to achieve a postal discount, and the first output group is routed to the first processing site after the critical number of documents is reached, wherein the first output group is formed from the documents contained in the critical number.

3. The method of claim 1, wherein for each of the attribute groups, the at least one common attribute is selected from a group of attributes consisting of: a particular date and time of creation, a particular due-out date, a particular paper type, a particular envelope type, a particular page count, a particular toner type, a particular barcode type, a particular roll capacity, a particular return mail address, and a particular insert requirement.

4. The method of claim 1, further comprising:
    assigning the plurality of attributes to each electronic document after the electronic documents are received and prior to sorting the electronic documents.

5. A non-transitory computer-readable medium containing computer-executable code comprising instructions configured to cause one or more processors to perform the method of claim 1.

6. A method comprising:
    receiving, at a computer system, a plurality of electronic documents designated for processing and delivery, each electronic document having a delivery zip code associated therewith;
    holding the plurality of electronic documents in a virtual warehouse in communication with the computer system until at least a critical number of electronic documents having similar zip codes is reached based on requirements to achieve a postal discount;
    routing, by the computer system, a group electronic documents having similar zip codes to a processing site for processing after at least the critical number is reached;
    routing, by the computer system, a first electronic document, prior to the critical number being reached, to a processing site, wherein the first electronic document is one of the group of electronic documents having similar zip codes;
    calculating a first cost of processing and mailing the group of electronic documents;
    calculating a second cost of processing and mailing the group of electronic documents along with one or more additional documents required to reach the critical number; and
    creating the additional documents and routing the additional documents to the processing site with the group of electronic documents responsive to determining that the second cost is less than the first cost.

7. The method of claim 6, wherein each electronic document has a due-out date associated therewith, and wherein when the due-out date of a first electronic document is impending prior to the critical number being reached, the first electronic document is routed to the processing site prior to the critical number being reached.

8. The method of claim 6, wherein each electronic document is assigned a plurality of attributes, and the critical number of electronic documents share a common attribute.

9. The method of claim 6, wherein the critical number of electronic documents having similar zip codes share a same three-digit zip code.

10. The method of claim 6, wherein the critical number of electronic documents having similar zip codes share a same five-digit zip code.

11. The method of claim 6, wherein routing the electronic documents having similar zip codes to a processing site comprises creating an output print file containing the electronic documents having similar zip codes and transmitting the output print file to the processing site.

12. A non-transitory computer-readable medium containing computer-executable code comprising instructions configured to cause one or more processors to perform the method of claim 6.

13. An apparatus comprising:
    an interface for electronic communication; and a processor coupled to the interface and configured to cause the apparatus to perform:

receiving a plurality of electronic documents designated for processing and delivery, each electronic document of the of electronic documents having a delivery zip code associated therewith;

holding the plurality of electronic documents in a virtual warehouse until at least a critical number of electronic documents having similar zip codes is reached based on requirements to achieve a postal discount;

calculating a first cost of processing and mailing a selected group of electronic documents;

calculating a second cost of processing and mailing the selected group of electronic documents along with one or more artificially-created additional documents required to reach the critical number of electronic documents to achieve a postal discount;

artificially creating, when the second cost is less than the first cost, the additional documents to be added to the selected group of electronic documents; and routing the selected group of electronic documents having similar zip codes to a processing site for processing after at least the critical number is reached.

14. The apparatus of claim 13, wherein each electronic document has a due-out date associated therewith, and wherein when the due-out date of a first electronic document is proximate prior to the critical number being reached, the first electronic document is routed to a processing site prior to the critical number being reached.

15. The apparatus of claim 14, wherein the first electronic document is one of a group of electronic documents having similar zip codes, and wherein when the due-out date of the first electronic document is proximate prior to the critical number being reached, the processor is configured to cause the apparatus to further perform:

calculating a first cost of processing and mailing the group of electronic documents;

calculating a second cost of processing and mailing the group of electronic documents along with one or more artificially-created additional documents required to reach the critical number; and artificially creating the additional documents and routing the additional documents to the processing site with the group when the second cost is less than the first cost.

16. The apparatus of claim 13, further comprising a memory connected to the processor, wherein the virtual warehouse resides in the memory.

17. The apparatus of claim 13, wherein each electronic document of the plurality of electronic documents is assigned a plurality of attributes, and the critical number of electronic documents share a common attribute.

18. The apparatus of claim 17, wherein the common attribute is selected from a group of attributes consisting of: a particular date and time of creation, a particular due-out date, a particular paper type, a particular envelope type, a particular page count, a particular toner type, a particular barcode type, a particular roll capacity, a particular return mail address, and a particular insert requirement.

19. The apparatus of claim 17, wherein the plurality of attributes are assigned to each electronic document after the electronic documents are received and prior to calculating a first cost of processing and mailing a selected group of electronic documents.

20. The apparatus of claim 13, wherein the critical number of electronic documents share a same three-digit zip code.

* * * * *